Sept. 21, 1943.  W. H. C. NESS ET AL  2,330,003
MACHINE FOR TREATING PLANTS IN ROWS WITH INSECTICIDE
Filed Aug. 12, 1941  4 Sheets-Sheet 1
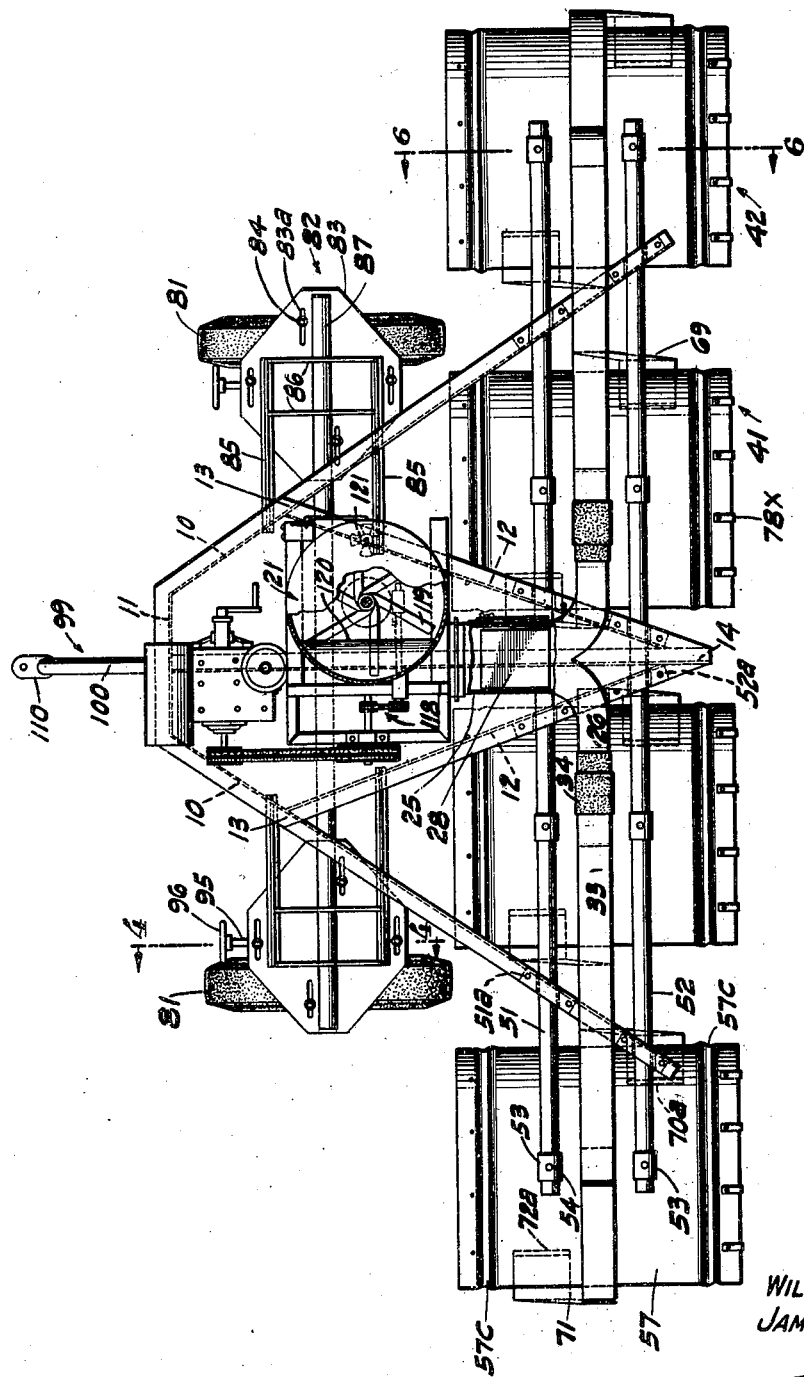
Fig. 1.
WILLIAM H. C. NESS,
JAMES F. HOLMES,
INVENTORS

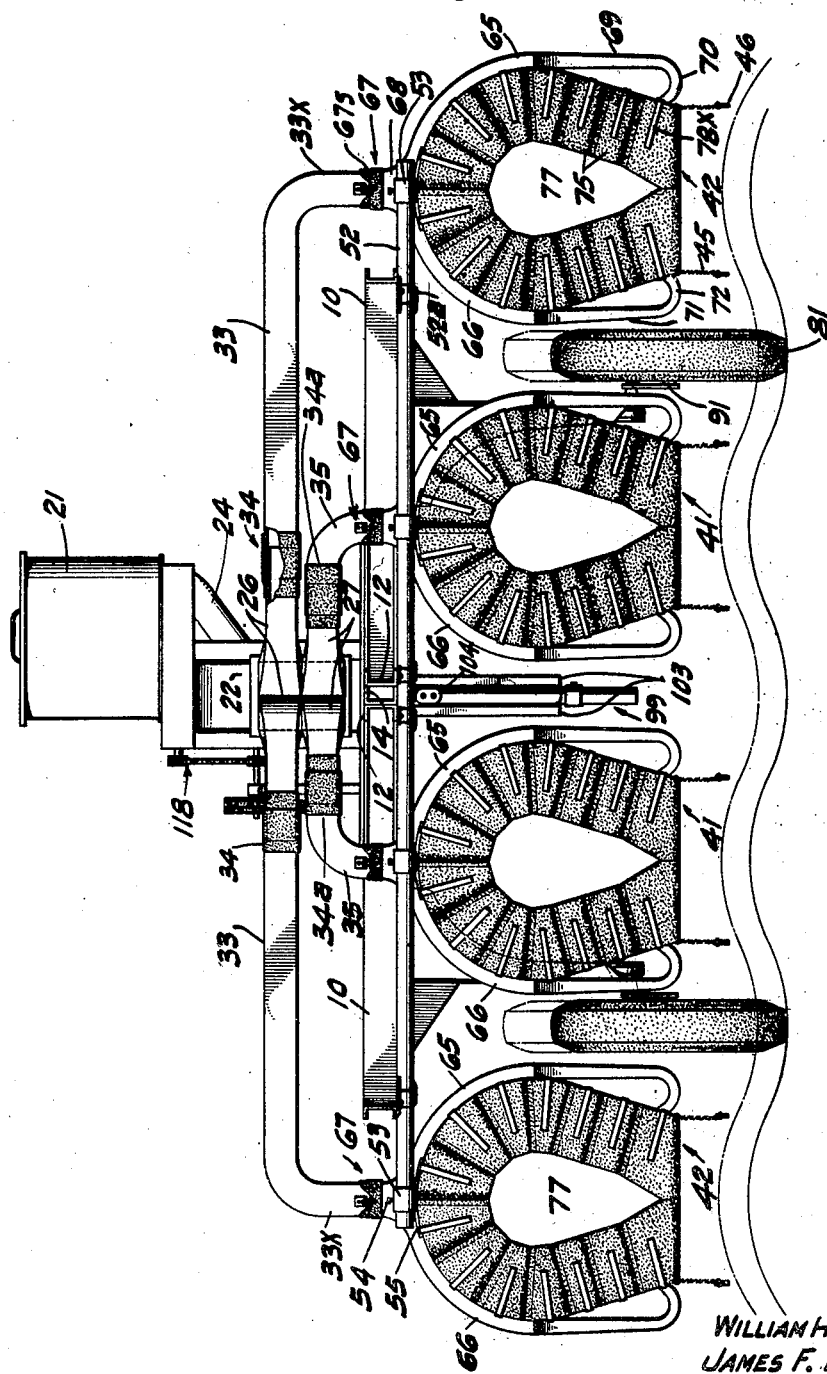

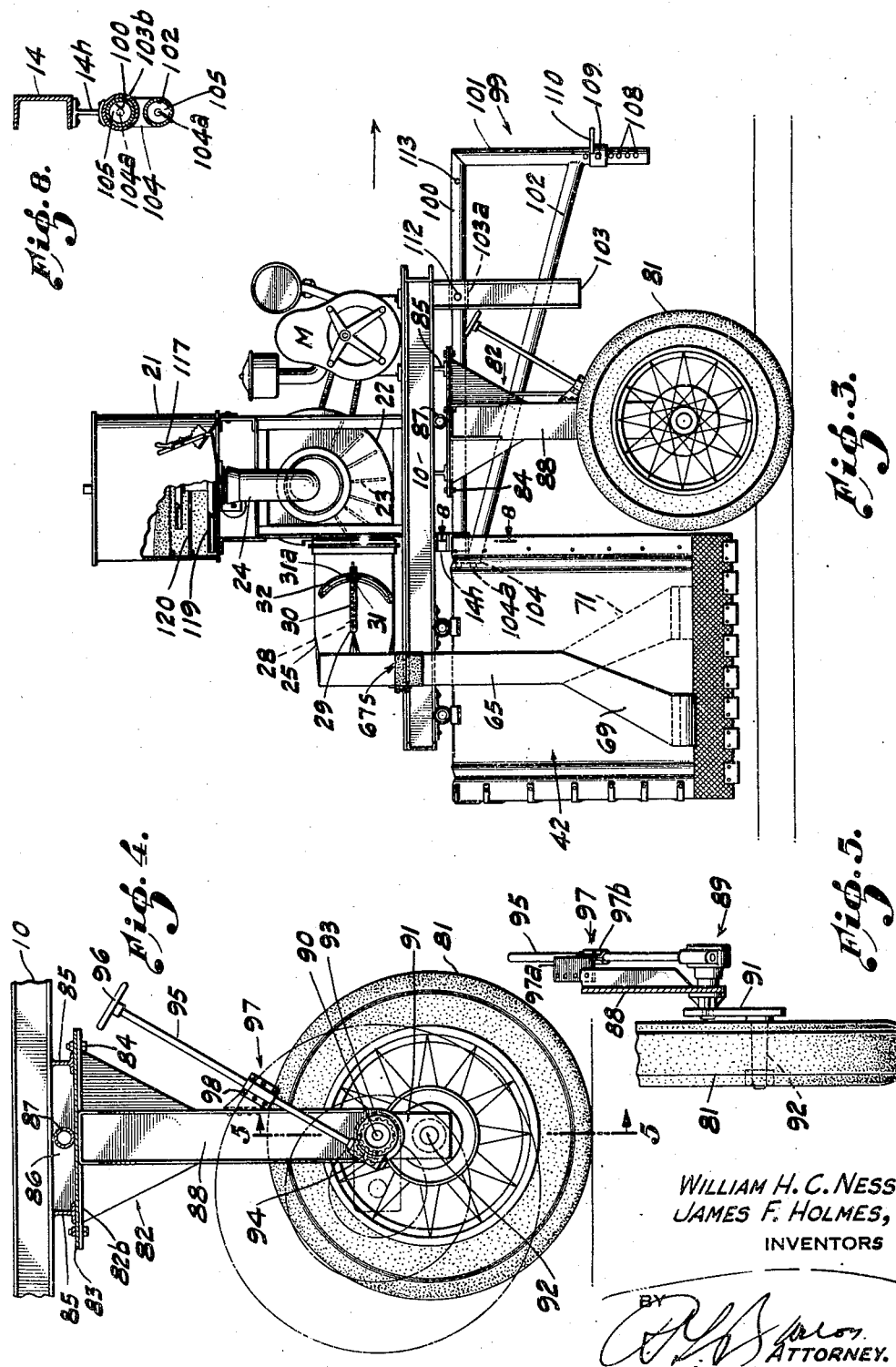

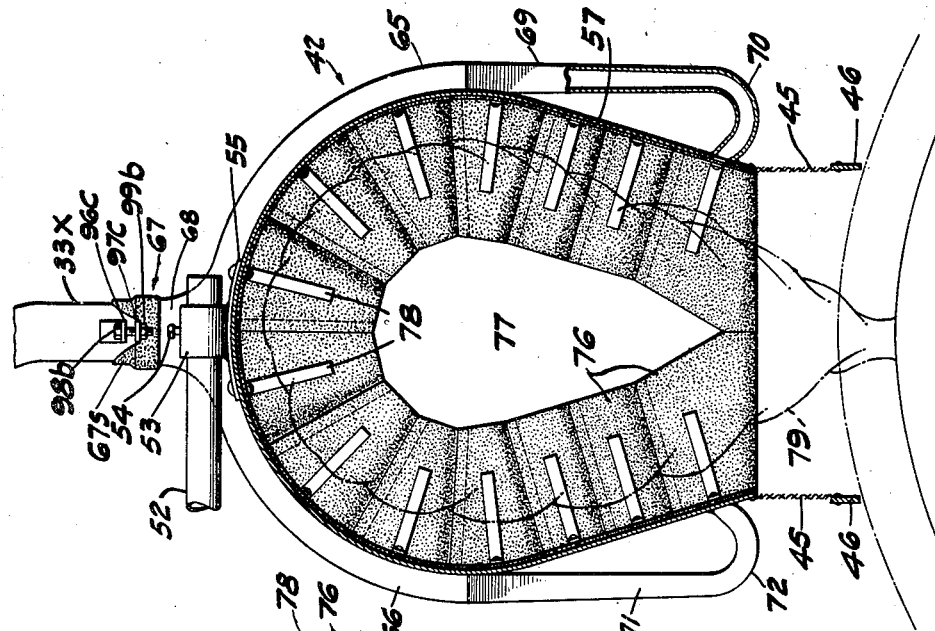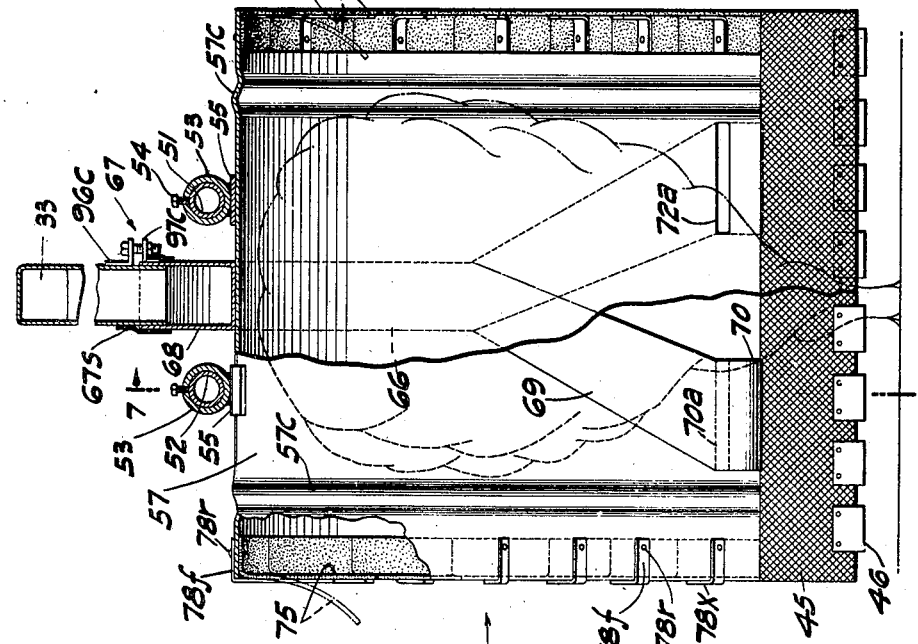

Patented Sept. 21, 1943

2,330,003

UNITED STATES PATENT OFFICE 2,330,003

MACHINE FOR TREATING PLANTS IN ROWS WITH INSECTICIDE

William H. C. Ness and James F. Holmes, Los Angeles, Calif., assignors to National Cornice Works, Los Angeles, Calif.

Application August 12, 1941, Serial No. 406,510

8 Claims. (Cl. 43—148)

This invention relates to machines for treating plants in rows with insecticide, and particularly to machines dispensing insect destroying powders where the impregnated spray is directed in an upward direction from the underneath side of the plants and then downwardly thereover while the plants are momentarily entrapped within a hood located rearwardly of the machine and moved successively over the plants as the machine is trailed down the rows of vegetation.

In many instances, one being that of the cotton plant and the boll weevil, parasites attack the plants from the underneath side and dusting equipment which applies materials onto the top are not effective. Especially is this true in row crop dusters that apply materials to the top side of the plants if there was any appreciable wind blowing, or air currents set up by the machine forward of the crop.

It is among the foremost objects of the invention to provide in a machine of the above character an enclosure for the plant which may momentarily cover it while the insecticide materials are being applied, thus more effectively treating the plant and eliminating the necessity of having to wait for a still atmosphere in which to make the application.

Another object of the invention is to provide in a device of the above stated character, a hooded means for temporarily enclosing the plants as it is moved thereover in relation to a single row or a plurality of rows while the insecticide materials are forced against the underside of the plants with sufficient force to drive them through the foliage of the entire plant thereby to insure thorough coverage and resultant maximum killing of the parasites.

A still further object of the invention is to provide for vertical as well as lateral adjustment of the hoods to accommodate different sized plants and rows of vegetation varying in width.

With the foregoing and other objects in view, the invention resides in the novel arrangement and combination of parts and in the details of construction hereinafter described and claimed, it being understood that changes in the precise embodiment of the invention herein disclosed may be made within due scope of that which is claimed without departing from the spirit of the invention.

Other objects, advantages and features of invention will hereinafter appear.

Referring to the accompanying drawings, which illustrate what is at present deemed, by reason of successful use, to be a preferred embodiment of the invention, Fig. 1 is a plan view of the entire machine, some upper portions thereof being broken away in order to show interior construction.

Fig. 2 is a rear elevation of the complete structure shown supported upon wheels as it appears when being used in a field of vegetation in rows. An adjusted position of the ground wheels is indicated by dotted lines. In the upper portion of the view a part of one of the conduit joints is broken away.

Fig. 3 is a side elevation looking from right to left in relation to Fig. 2. In this view a part of the insecticide container is broken away to show interior construction.

Fig. 4 is a fragmentary side elevational detail on line 4—4 of Fig. 1, showing on an enlarged scale the mechanism for varying the elevation of the frame in order to regulate the device for use upon plants differing in height. The dotted lines indicate a different adjusted position of the supporting ground wheel.

Fig. 5 is a fragmentary sectional detail on line 5—5 of Fig. 4, the ground wheel and some other parts on the near side of the plane of section being shown in elevation.

Fig. 6 is a partly a side elevation and partly a longitudinal mid-section through one of the hoods, on line 6—6 of Fig. 1, the scale being larger than in the latter view. Part of one of the conduits is broken away to contract the view.

Fig. 7 is a transverse section on line 7—7 of Fig. 6, some parts being shown partly in elevation and partly in section.

Fig. 8 is a large scale sectional detail, the line 8—8 on Fig. 3 indicating the plane of section.

Referring in detail to the drawings, the upper portion of the machine is provided with a horizontally disposed frame which includes an elongated frame member 10 at each side, these frame members converging toward each other toward the front end of the machine where they are rigidly united by the front member 11; and a pair of twin intermediate elongated frame members 12 which have their diverging front ends welded or otherwise secured to said members 10 at 13 not far from the front end of the frame, the rear ends of said members 12 being rigidly secured by welding or otherwise to the back part of a frame member 14 which extends toward the front end of the machine. By preference and as shown, these various frame members are all constructed as channel irons, thus affording a strong and not too heavy main frame for the assembled parts of the machine.

Upon the aforesaid frame is supported a hopper or reservoir 21 which is provided internally with suitable means for agitating an insecticide powder and delivering it to the conduit system of the machine whence it is directed upon the plants. This hopper and its internal construction are not described in detail, because they have already been described in our co-pending application, filed August 3, 1940; Ser. No. 350,905, which has become Patent No. 2,253,802, issued August 26, 1941, and separately considered, form no part of the present invention.

From said hopper 21 the insecticide is delivered through an inclined tube 24 to a centrifugal blower 22, the fan blades 23 of which rotate in a vertical plane, and force the insecticide through the housing or short tube 25 to the upper conduit bifurcations 26 which communicate with the upper part of said tube 25, and to the lower conduit bifurcations 27, which communicate with the lower part of said tube 25.

A swingable damper 28, mounted within the tube section 25, may be adjusted to direct all the air current from the blower either into the upper bifurcations 26 or into the lower bifurcations 27, or to divide the stream of air so that a portion of it is delivered to both sets of bifurcations, the free end of the damper being directed toward the incoming current. The pivot 29 of said damper turns therewith and is located at the mid-height of the tube section 25. Said pivot carries a radial operating arm 30 provided with a laterally projecting pin 31. Said pin is guided by a slotted bracket 32, a wing nut 31a screwing onto the pin to secure it in its adjusted position in the slot of the bracket.

Each of the upper bifurcations 26 projects horizontally outward toward its side of the machine, and has telescoped over it the inner end of a conduit 33, a rubber sleeve 34 surrounding the telescoping parts of the conduits 26 and 33 at each side of the machine to prevent leakage of air. The purpose of uniting the conduit sections 26 and 33 in this extensible manner is that they may be adjusted to deliver the insecticide to rows of plants which are spaced apart at various distances. The conduit structure which has just been described is in a general way duplicated with regard to the lower conduit sections 35, which however are much shorter, being likewise telescoped over the lower bifurcations 27 where the joints are likewise protected from air leakage by rubber sleeves 34a.

The conduit structures which have been described are arranged to deliver the insecticide to the interior of the inner hoods 41 and outer hoods 42, all shown in Fig. 2.

In order to guard as much as possible against the escape of the insecticide from the lower portion of said hoods a flexible skirt member 45 has its upper edge attached to the lower portion of each side of each hood, and a series of weights 46 are secured to the lower edge portion of each of these skirt members, said weights trailing upon, or coming very close to, the surface of the ground as the machine advances.

A transversely extending pair of tubular mounting members 51 and 52 serve to support the four hood structures which have been mentioned. The tube 51 is attached to the four overlying frame members 10 and 12 by means of hangers 51a, and the tube 52 is attached to said frame members by hangers 52a. In order to adjust said hood structures at different distances from each other to conform to different widths of rows of plants to be treated, collars 53 are adjustably mounted upon said tubes and are secured in their adjusted positions by means of set screws 54. Rigid connections are made between these collars and the hoods by means of clips 55 which are welded or otherwise secured to the ovoidal or horseshoe shaped sheet metal bands or plates 57 which form all except the end portions of the hood structures. Said plates 57 each have a corrugation 57c in an adjacent, parallel relation to each end to afford a maximum rigidity with minimum weight of metal.

Each of the four hood structures, shown in Figs. 3, 6 and 7 has the current of air impregnated with insecticide delivered to it at opposite sides of its lower portion and in a staggered manner, that is to say, the air is delivered from a tube 65 into the rear portion of the hood and from a tube 66 into the front portion of the hood. Describing the tube connections for the outer hoods 42, each conduit 33 has a downwardly directed end portion 33x which, by means of a detachable joint structure 67, is connected with a tubular shank 68 from which the current of air is spread to both the terminal tube sections 65 and 66. The lower part of the tube section 65 has a rearwardly inclined delivery end portion 69 furnished with a hooked terminal portion 70.

Similarly the lower part of the tube section 66 has a forwardly inclined delivery end portion 71 furnished with a hooked terminal portion 72. Said hooked portions 70 and 72 connect respectively with the elongated air intake apertures 70a and 72a. The delivery of the impregnated air to the hoods is rendered more effective by reason of the wide flattened character of the mouths of said tubes which cooperate with said elongated openings; and also effectiveness is added by the diagonally opposite arrangement of said intake apertures plus the fact that the upward inclination of the discharge end portions of the said tubes directs the air in a somewhat tangential manner thus adding to the circulatory movement within the hood. The means for delivering the insecticide to the middle pair of hoods 41 comprises detachable joint structures and terminal tube structures which are substantially identical to those already described for the outer hoods, hence are lettered in the same way and do not need to be described in detail.

The structural details of the various hoods, which are all of the same design, are more fully shown in Figs. 6 and 7, where each hood is shown having a series of imbricated rubber flaps 75 at its back and similar front flaps 76, all these flaps being secured to the inner surface of the hoods near each end, in such a manner that the end of each hood is normally closed except for the opening 77 of a generally ovoidal shape having its large end directed upwardly. In Fig. 7, where the observer is looking into the rear end of the hood, the front flaps 76 are seen along the inner margin of the front end of the hood, and a series of angular leaf springs 78 are shown, one limb of these springs being riveted to the sheet metal in such a manner as to serve for an attaching means for the aforesaid rubber flaps. In Fig. 7 the outline of a plant 79 is indicated, it being assumed that the machine has advanced, thus causing the yielding flaps 76 to admit said plant within the hood after which the flaps have moved back to their normal position under the urge of the springs 78. At the opposite, that is to say, the rear end of each hood, the flap structure is the same except that the springs 78x, although shaped angularly like the springs 78 have the foot portions 78f secured externally to the sheet metal portion of the hood, the rivets or other fasteners 78r being relied upon to secure the rubber flaps 75 in place. Said springs 78x are deflected outwardly from the hood as the plants emerge from its rear end, thereupon pressing against the outer faces of the flaps to restore them to their normal position.

In order to provide for varying the distance of the hoods above the ground, so as to envelope to better advantage plants of different heights, a means is provided for vertical adjustment of the ground wheels 81 in relation to the frame of the vehicle. For this purpose a downwardly extended bracket structure 82 is provided above each wheel, said bracket structure being secured adjustably to a horizontal hanger plate 83 by means of bolts 84 which pass through slots 83a in said plate as well as through holes in the flanges with which the bracket structure 82 is provided. Said hanger plate is secured to the superjacent, horizontal frame members 10 and 12 by means of a metal frame consisting of the side bars 85, which are T-shaped in cross section with their webs directed upwardly, and the reinforcing plates 86. The basal portions of these bars and plates are welded to the upper face of said plate 83 and the upper edge portions of bars 85 are welded to the lower sides of the frame members 10 and 12. This structure is stabilized by the tubular strut 87 which passes through close fitting holes provided for it in said cross plates 86, said strut extending from side to side and having its upper side welded to the frame pieces 10 and 12 and its lower side welded to said hanger plate 83.

The aforesaid bracket structure 82 serves as a mounting means for a leg 88, the lower portion of which carries rigidly a housing 89 within which turns a stub shaft 90. One end of said stub shaft has fixed to it an arm 91 to which in turn is secured the spindle 92 of the wheel. To the opposite end portion of said shaft 90 is secured a worm gear 93 with which meshes a worm 94 fixed to the lower end of an operating shaft 95 having a hand wheel 96 at its upper end. Said shaft 95 passes through a combined clamp and bearing structure 97 carried by the leg 88, in a considerably spaced relation to the worm 94. Said clamp 97 consists of plates 97a and 97b which may be gripped against the shaft 95 by means of screws 98. By the arrangement which has just been described each wheel may be considerably adjusted in a vertical manner and then securely maintained in the adjusted position by the clamp 97.

The triangular traction frame 99, seen in side elevation in Fig. 3, consists of a main, upper horizontal tubular bar 100 to the front end of which is secured a downwardly directed bar 101, a diagonal brace bar 102 completing the frame. A pair of channel beams 103 depend from the front part of the vehicle frame and between the upper portions of said beams a collar 103a is welded or otherwise secured in position to form a support within which slides the forward part of said bar 100, the back portion of said bar sliding within a collar 103b (see Fig. 8) pendantly supported from the frame member 14 by means of an I-shaped hanger 14h suitably riveted or otherwise secured to said members within which it is interposed. A link plate 104, attached by screws 104a to plugs 105 secured within the back ends of the tubular members 100 and 102 fastens together the back end portions of said tubular members.

Below the front end of the brace bar 102 the bar 101 is provided with a series of bolt holes 108 to cooperate with the pin 109 of the traction clip or clevis 110 to which the traction vehicle is connected. The vertical adjustment of said clip 110 should accord with the vertical adjustment of the spindles of the ground wheels. A pin 112 is inserted through alined holes in the paired vertical bars 103, collar 103a and tubular traction bar 100 when said bar 100 is in the extended position shown in Fig. 3 to assume the tractive force. When said bar 100 is retracted a hole 113 through its front portion registers with the aforesaid holes in the bars 103 and collar 103a to receive said pin and thereby maintain said bar 100 in its retracted position.

Describing certain structural details shown in the drawings, in the joint structure 67 shown in the upper part of Figs. 6 and 7, angular clips 96c and 97c are respectively welded or otherwise secured to the tubular members 33x and 68 near their ends, and a clamping bolt 98b passed through apertures in said clips is furnished with a nut 99b whereby said tubular members are secured together in a communicating relation to each other. As will be seen from Fig. 7, the rubber 67s is necessarily depressed at one side to accommodate itself to the projecting arms of said clips; but its effectiveness as an air seal is not materially impaired, because it still encircles all except a small segment of the mouth of the lower tube 68.

Preparatory to putting the machine into operation the workman will see to it that the two ground wheels are spaced at the proper distance from each other to avoid encountering the rows of plants to be treated, it being desirable that each wheel make its track midway between adjacent rows of plants. To make this adjustment it is only necessary to loosen the nuts of bolts 84 (Figs. 1 and 4), adjust each wheel inwardly or outwardly in respect to the length of the machine, as may be required, and then screw the nuts back into place to clamp the wheel supports in the adjusted positions.

In conjunction with adjusting the ground wheels as aforesaid, the four hoods will be adjusted to accurately register with the rows of plants to be successively enclosed by them as the machine is trailed in the direction which such rows extend. This adjustment is effected by loosening the set screws 54 (Figs. 6 and 7) and then sliding each hood supporting collar 53 along the tubes 51 and 52 to the required position.

In connection with the aforementioned adjustments of the ground wheels and hoods it will be necessary to make the proper height adjustment of the ground wheels as indicated in Fig. 4. This will be effected by loosening the screws 98 that clamp the worm shaft 95 against rotation, rotating said shaft in the proper direction to the extent necessary to adjust the ground wheels to the proper heights in relation to the vehicle frame, and then tightening said clamping screws 98.

After supplying powdered insecticide to the reservoir 21, adjusting properly the feed control 117 and damper 28, the blower motor M will be put into operation at the same time that a propelling vehicle is made use of to trail the machine along the rows of plants to be treated. By means of the auxiliary driving mechanism 118

(Fig. 1), the insecticide is fed from the hopper 21 by blades 119, conveying the material under shelves 120, over metering valve 121 into tube 24, whence by gravity and fan suction it is blown by the fan blades into the duct 25 from which it is distributed to the several hoods.

The upwardly directed staggered currents of air delivered to the lower portions of the hoods will apply the insecticide efficiently to the under surfaces of the leaves of the plants, whether said plants are low growing vegetables and/or stalks of considerable height.

If it is desired to treat only two rows of plants at a time the outer hoods 42 may be removed and only the inner hoods 41 made use of. Preparatory to doing this the two outermost set screws 54 will be loosened to free the collars 53 into which they extend, whereupon each outer hood 42, together with the conduit structure adjacent to it, may be moved laterally outward from the machine to a detached position. The telescopic joint structures 34 facilitate this operation because they permit the tube sections 33 to be withdrawn from the tubular members 26. After the outer hoods have been removed in the manner stated, the inner hoods 41 will be adjusted the desired distance from each other in a manner which will be readily understood in view of the foregoing description.

What is claimed is:

1. In a machine for applying insecticides to plants in rows, a vehicular structure including a frame supported by ground wheels, an elongated hood having a sheet metal portion which forms a housing with open ends and an open bottom, means constructed and arranged to support said hood upon said frame with its bottom adjacent to the ground and positioned astride a row of plants to be treated with insecticide, said hood having a series of imbricated flexible inwardly extending spring pressed flaps carried by each end portion and normally closing each end of the hood except for an opening of a generally ovoidal shape having its large end directed upwardly, and means operated to deliver a current of air impregnated with an insecticide to the interior of said hood.

2. In a machine for applying insecticides to plants in rows, a vehicular structure including a frame supported by ground wheels, a plurality of hoods each having a sheet metal portion forming in transverse section a substantially horse-shoe shaped housing with open ends and an open bottom, means constructed and arranged to support each of said hoods upon said frame for adjustment at varying distances from each other with the open bottom of each hood adjacent to the ground and positioned to straddle a row of plants to be treated with insecticide, each of said hoods having at each end a series of imbricated inwardly extending spring pressed rubber flaps which close the ends of the hoods except for a central ovoidal opening through which the plants pass, and means operated to deliver a current of air impregnated with insecticide to the interior of a plurality of said hoods at the same time.

3. A hood for insecticide machines consisting of a horse-shoe shaped sheet metal portion forming a housing with open ends and an open bottom, each end portion of said hood having a series of imbricated inwardly directed spring pressed marginal flaps of a flexible character normally closing the ends of the hood except for an opening of a generally ovoidal shape having its large end directed upwardly through which the plants enter and leave, said hood having also a skirt portion to trail along the ground adjacent to a row of plants being treated with insecticide delivered interiorly to said hood.

4. The subject matter of claim 3 and, said skirt portion extending along both of the opposite sides of said hood, a series of weights secured to the lower edge of each of said skirt portions, means for moving said hood in an endwise manner along a row of plants thereunder, means to deliver air impregnated with insecticide to the interior of said hood simultaneously with moving the latter along the row of plants, said air delivery means including two hooked air conduits, one communicating with the lower back part of one of the sides of said hood and the other of said conduits communicating with the forward part of the opposite side of said hood, and both of said conduits communicating with said hood at a common level.

5. In a machine for applying insecticides to plants in rows, a vehicular structure including a frame supported by ground wheels, an elongated hood having a sheet metal portion which forms a housing with open ends and an open bottom, means constructed and arranged to support said hood upon said frame with its bottom adjacent to the ground and positioned astride a row of plants to be treated with insecticide, said hood having flexible inwardly extending flaps carried by its end portions, said vehicular structure being furnished with a hitch member for trailing it to advance said hood along a row of plants being treated, springs carried by the metal portion of said hood and constructed and arranged to return said flaps to their normal position after the latter have been deflected by contact with the plants being treated, and means operated to deliver a current of air impregnated with an insecticide to the interior of said hood.

6. The subject matter of claim 5 and, said springs comprising resilient arms which contact with the rear surfaces of the flaps at each end of said hood.

7. The subject matter of claim 5 and, at least some of said springs consisting of angular metal strips having attaching limbs to grip portions of said flaps against metal portion of said hood, and fastening means extending through said attaching limbs and the portions of the flaps gripped by them.

8. In a machine for applying insecticides to plants in rows, a hood of an inverted trough shape and closed at the top, means for moving said hood in an endwise manner along a row of plants thereunder, and means to deliver air impregnated with insecticide to the interior of said hood simultaneously with moving the latter along the row of plants, said air delivery means including only two air conduits, one communicating with the lower back part of one of the sides of said hood and the other of said conduits communicating with the lower forward part of the opposite side of said hood.

WILLIAM H. C. NESS.
JAMES F. HOLMES.